(12) United States Patent
Palanisamy et al.

(10) Patent No.: US 11,995,579 B2
(45) Date of Patent: May 28, 2024

(54) PLANNER INSIGHT FOR FLAT SHEET INDUSTRIES

(71) Applicant: Honeywell Limited, Mississauga (CA)

(72) Inventors: LingaThurai Palanisamy, Bangalore (IN); Gajanan Rothe, Bangalore (IN); Avijit Das, Bangalore (IN)

(73) Assignee: Honeywell Limited, Mississauga (CA)

( * ) Notice: Subject to any disclaimer, the term of this patent is extended or adjusted under 35 U.S.C. 154(b) by 1162 days.

(21) Appl. No.: 16/751,421

(22) Filed: Jan. 24, 2020

(65) Prior Publication Data

US 2021/0232985 A1 Jul. 29, 2021

(51) Int. Cl.
*G06Q 10/04* (2023.01)
*G05B 19/18* (2006.01)
*G06Q 10/0631* (2023.01)
*G06Q 10/0875* (2023.01)

(52) U.S. Cl.
CPC ......... *G06Q 10/043* (2013.01); *G05B 19/188* (2013.01); *G06Q 10/06315* (2013.01); *G06Q 10/0875* (2013.01); *G05B 2219/35162* (2013.01); *G05B 2219/35188* (2013.01)

(58) Field of Classification Search
None
See application file for complete search history.

(56) References Cited

U.S. PATENT DOCUMENTS

| | | | |
|---|---|---|---|
| 7,100,657 B2 | 9/2006 | Kataoka et al. | |
| 7,610,114 B2 | 10/2009 | Kapadi et al. | |
| 7,987,016 B2 | 7/2011 | Karhu | |
| 9,187,285 B2 | 11/2015 | Daul | |
| 9,260,266 B2 | 2/2016 | Föhr et al. | |
| 2004/0102867 A1 | 5/2004 | Palanisamy | |
| 2014/0025189 A1 | 1/2014 | Sunkara | |
| 2017/0203457 A1 | 7/2017 | Goulimis | |

FOREIGN PATENT DOCUMENTS

JP 2002304426 A 10/2002

OTHER PUBLICATIONS

Office Action for corresponding JP Application No. 2021-008821.
Translation of Office Action in JP Application No. 2021-008821.
Machine Translation of JP 2002304426.

*Primary Examiner* — Sean Shechtman
(74) *Attorney, Agent, or Firm* — Charles H Jew (57) ABSTRACT

Planner insight analytics identifies orders and sizes customers can execute to achieve business and operational efficiency. Generating optimal trimming patterns for trimming raw rolls and/or sheets of a flat sheet stock/customer orders includes: (a) receiving customer orders, primary and secondary machine specifications, warehouse inventory, and trade constraints; and (b) generating solutions for (i) order quantity fulfillment, (ii) a primary cutting pattern for the primary machine, (iii) a secondary cutting pattern for the secondary machine, and (iv) inventory details, wherein the solutions are generated with consideration of the initial trade constraints; (c) executing a batch and generating suggestions; (d) generating modified solutions for the parameters in step (b) using revised trade constraints derived from the suggestions generated that override the initial trade constraints in (c); and (e) operating a cutting apparatus. Trim optimization knapsack algorithm with objective function with term relating to trim loss which is eventually minimized is employed.

17 Claims, 5 Drawing Sheets

PLANNER INSIGHT FOR FLAT SHEET INDUSTRIES

FIELD OF THE INVENTION

The present invention relates to techniques for improving trimming operations in flat sheet industries and particularly to an overall trim planning process that integrates the quality control system with primary and secondary trimming equipment and which generates trim solutions that are based on yield or loss instead of on minimization of master rolls used to fulfill customer demands.

BACKGROUND OF THE INVENTION

The flat sheet industry produces steel, paper, aluminum, dry plastic film, lithium ion separators, digital displays and the like in the form of raw rolls or sheets. The raw rolls or sheets have varying widths, diameters (or lengths), quantities, and qualities. The width and diameter of these raw rolls depend on the specifications of the machines that manufacture them. Customers often order product rolls or sheets that have smaller dimensions than those of the raw rolls or sheets. Therefore, raw rolls or sheets must be cut or trimmed into product rolls or sheets.

In the paper industry, a papermaking machine produces large rolls of paper which are called reels. The width of the reel is referred to as the deckle and is normally fixed for each machine. Trimming or charting employs secondary processing equipment including, for instance, winders, rewinders, sheeters, trimmers, and cutters. The winder cuts the reels into rolls of smaller diameter and width. Trimming which is also known as secondary processing is implemented in one or more steps or phases depending on the specific dimensions needing to be charted. Usually, multiple steps are required due to the inherent limitations of the secondary processing equipment in terms of their abilities of handling different dimensions.

Trimming is typically carried out multiple times a day or week and these charting operations can consist of separate charting for each shift or as separate charting for a group of customer orders called charting batches. The trimming process primarily includes the determination of the necessary trimming patterns according to which large sized raw rolls and/or sheets are processed on secondary processing equipment to fulfill a set of customer orders. The attributes of the customer orders are typically width, diameter (or length), ordered quantity (within certain tolerances), product type and delivery date.

Trimming is a classical combinatorial optimization problem where the solution is to find the right combination of various customer orders on a winder machine of the same product type to achieve certain objectives. Most trim algorithms focus on minimization of the number master rolls used to fulfill customer demand with relaxation on the upper bound of the demand constraints instead of minimization of the trim loss. Consequently, suboptimal solutions are derived for the original problem. The algorithms can also lead to practically no usable solutions. There is a need for techniques for obtaining trim solutions which are based on yield or loss instead of minimization of the rolls.

SUMMARY OF THE INVENTION

The present invention is based in part on the development of analytics which identifies the sizes and quantities of rolls and/or sheets of material which are particularly suitable for trimming in a particular batch by correlating the cost impact of size. Analytics provides multiple suggestions regarding the orders and sizes customers can make to achieve business efficiency. These planner insights or strategies will reduce subjective-based reliance in planning by reducing the cost associated with manually executing multiple iterations in reaching the desired trim loss and will improve operational efficiencies such as by minimizing rewinder usage and enhancing the throughput of secondary equipment.

In one aspect, the invention is directed to a method of generating optimal trimming patterns for trimming raw rolls and/or sheets for fulfillment of a flat sheet stock and/or customer orders that includes:
(a) receiving customer order specifications;
(b) receiving primary machine specifications;
(c) receiving secondary machine specifications;
(d) receiving warehouse inventory specifications;
(e) receiving trade constraints;
(f) generating solutions for the following parameters (i) order quantity fulfillment, (ii) a primary cutting pattern for the primary machine, (iii) a secondary cutting pattern for the secondary machine, and (iv) inventory details, wherein the solutions are generated with consideration of initially received trade constraints;
(g) executing a batch and generating suggestions;
(h) generating modified solutions for the parameters in step (f) using revised trade constraints derived from the suggestions generated in (g), which override the initial trade and inventory constraints; and
(i) operating a cutting apparatus by:
receiving a reel or sheet of material to be cut;
configuring the cutting apparatus with the modified solutions generated in step (h); and
operating the configured cutting apparatus to cut the reel or sheet of material into a plurality of smaller reels or sheets.

In another aspect, the invention is directed to a trimming system which includes a computer device that automatically calculates the above-described optimal trimming patterns and a cutting apparatus for cutting a reel or sheet of material into a plurality of smaller reels or sheets of material, wherein the cutting apparatus is configured to receive the modified solutions generated by the computer device.

A feature of the present invention is employment of a trim optimization which includes column generation that internally uses a Knapsack algorithm with an objective function that contains a term relating to trim loss which is eventually minimized. In particular, the Knapsack has an objective which includes the dualities of both upper and lower bound demand constraints with subtraction of the total trim loss. The Knapsack objective function is not for minimization of the total number of rolls which are used in the batch. The Knapsack algorithm also integrates an upper bound for the demands and minimum deckle. Normally, a Knapsack algorithm will create a pattern with only a single deckle for a given set of sizes. If the set of sizes cannot be cut from within the given deckle, then another (or secondary) Knapsack is used to generate the parent roll. The present invention's unique approach allows incorporating a single Knapsack for both the parent and order width. In particular, the Knapsack algorithm handles the parent roll for secondary processing with a single Knapsack routine which has constraints related to size limitations in the secondary processing and to number of cuts in the primary and secondary processing. The innovative Knapsack formulation takes into account both primary and secondary cutting with edge loss and other constraints. The invention provides the suggestions for reduction of trim loss which works on the shadow price concepts A batch refers to a set of must make and optional orders of the same or similar product type which are combined together and produced by charting of larger sized raw and/or inventory rolls and/or sheets. Trimming loss refers to loss of quantity during the charting process of cutting larger sized raw rolls and/or sheets into smaller product rolls and/or sheets as specified by customer orders. A customer order or order is a customer or internal stock order that typically includes product specifications, product name, product dimensions such as size (width), length or diameter, quantity in terms of the number of rolls, weight measurement unit, customer name, delivery schedule, product price and specific discounts, if any.

While the invention will be illustrated as being implemented in papermaking, it is understood that the invention is applicable in general to any complex processing facility and to other continuous sheet making processes such as, for example, in the manufacturer of rubber sheets, plastic film, metal foil, and the like.

DETAILED DESCRIPTION OF PREFERRED EMBODIMENTS

Figure 1A:
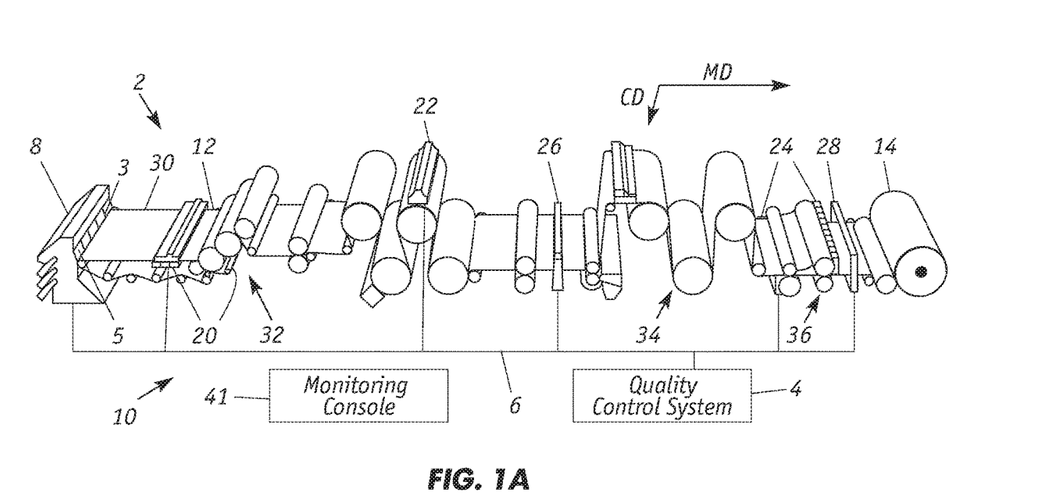
FIG. 1A is a schematic illustration of a papermaking system.

As shown in FIG. 1A, a sheet-making system 10 includes papermaking machine 2, quality control system 4 and network 6. The papermaking machine 2 produces a continuous sheet of paper material 12 that is collected in take-up reel 14. The paper material 12 is produced from a pulp suspension feedstock, comprising of an aqueous mixture of wood fibers and other materials, which undergoes various unit operations that are monitored and controlled by a quality control system 4. The network 6 facilitates communication between the components of system 10.

The papermaking machine 2 includes a headbox 8, which distributes an aqueous pulp suspension uniformly across the machine onto a continuous screen or wire 30 that is moving in the machine direction (MD). Headbox 8 includes slice openings through which the pulp suspension is distributed onto screen or wire 30, such as a mesh, for receiving a pulp suspension and allowing water or other materials to drain or leave the pulp suspension. The formation of the paper sheet 12 is influenced by a plurality of linear actuators 3 extending in the cross direction across the sheet 12 of paper being formed. Actuators 3 control the sheet's weight in the cross direction (CD). Sensors located downstream from the actuators measure the properties of the sheet. The feedstock is fed from the head box through a gap or elongated orifice 5 onto a wire section 30. Weight profile control in such an arrangement is achieved by locally adjusting the position of the slice lip across the machine with motorized linear actuators 3 to vary the dimensions of the gap or orifice immediately adjacent the actuator.

Sheet 12 then enters a press section 32, which includes multiple press rolls where sheet 12 travels through the openings (referred to as "nips") between pairs of counter-rotating rolls in press section 32. In this way, the rolls in press section 32 compress the pulp material forming sheet 12. As sheet 12 travels over a series of heated rolls in dryer section 34, more water in sheet 12 is evaporated. A calendar 36 processes and finishes sheet 12, for example, by smoothing and imparting a final finish, thickness, gloss, or other characteristic to sheet 12. An array of induction heating actuators 24 applies heat along the CD to one or more of the rollers to control the roll diameters and thereby the size of the nips. Once processing by calendar 36 is complete, sheet 12 is collected onto reel 14.

Sheetmaking system 10 further includes an array of steam actuators 20 that controls the amount of hot steam that is projected along the CD. The hot steam increases the paper surface temperature and allows for easier cross direction removal of water from the paper sheet. Also, to reduce or prevent over drying of the paper sheet, paper material 14 is sprayed with water in the CD. Similarly, an array of rewet shower actuators 22 controls the amount of water that is applied along the CD.

In order to control the papermaking process, selected properties of sheet 12 are continuously measured and the papermaking machine 2 adjusted to ensure sheet quality. Typical physical characteristics of paper that are can be measured include, for example, thickness, basis weight, moisture content, chemical composition, surface roughness, gloss, caliper, and crepe pattern surface features. CD control may be achieved by measuring sheet properties using one or more scanners 26, 28 that are capable of scanning sheet 12 and measuring one or more characteristics of sheet 12. For example, scanner 28 could carry sensors for measuring the dry weight, moisture content, ash content, or any other or additional characteristics of sheet 12. Scanner 28 includes suitable structures for measuring or detecting one or more characteristics of sheet 12, such as a set or array of sensors.

Measurements from scanners 26 and 28 are provided to control system 4 that adjusts various operations of papermaking machine 2 that affect machine direction characteristics of sheet 12. A machine direction characteristic of sheet 12 generally refers to an average characteristic of sheet 12 that varies and is controlled in the machine direction. In this example, quality control system (QCS) 4 is capable of controlling the dry weight of the paper sheet by adjusting the supply of pulp to the headbox 8. For example, QCS 4 could provide information to a stock flow controller that regulates the flow of stock through valves and to headbox 8. QCS 4 includes any hardware, software, firmware, or combination thereof for controlling the operation of the sheetmaking machine 2 or other machine. QCS 4 can, for example, include a processor and memory storing instructions and data used, generated, and collected by the processor.

Parent or master reels of paper that are manufactured are processed through secondary equipment to produce child rolls that are stored in warehouses. The reels from different papermaking machines typically have different deckles and grades and several sets of rolls can be made from each reel. The widths and diameters of these rolls must match customer requirements set forth in customer orders. Sometimes a manufacturer may produce more or less (within specified tolerances) than an ordered amount. The amount produced in excess of the order quantity is call overrun and production shortfalls are called underruns. Trimming is the process of cutting a reel to make rolls. A pattern for trimming is a combination of different roll widths that sum up to a given deckle size.

Some paper mills and plants have jumbo processing machines that includes a paper machine reel, coater, extruder and rereeler. The jumbo machine performs the first cuts on the parent or master reel. In this case, the jumbo processing equipment comprises the primary equipment and a winder is part of the secondary equipment. For the present planner insight invention, the primary equipment refers to devices that perform the first cuts and the secondary equipment refers to devices that execute subsequent trimming.

Figure 1B:
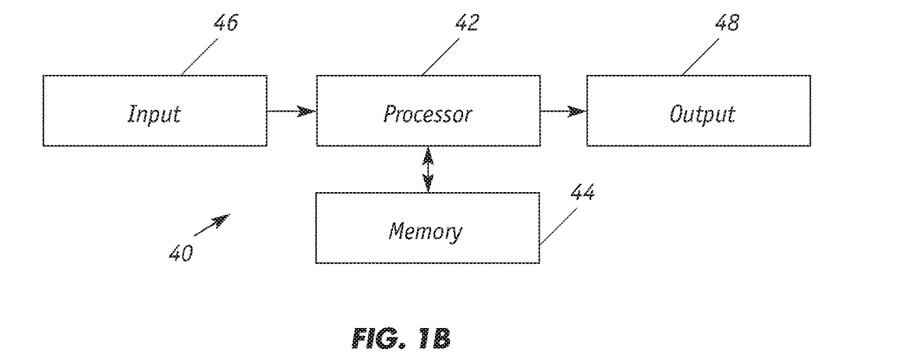
FIG. 1B illustrates a system for implementing the planner insight model of the present invention.

As shown in FIG. 1B, the optimization model of the present invention can be implemented in a planner insight system 40 that includes a process 42, a memory 44, an input device 46, and an output device 48. The memory includes a database that is used to store information entered by the input device or otherwise. The planner insight system 40 is operatively connected to primary and secondary equipment that are described herein.

Charting or trimming is carried out using a set of specific equipment (e.g., winder, rewinder, sheeter, trimmer, cutter, etc.) in various flat sheet industries. The winder is referred to as the primary processing equipment when there is no jumbo process machine in the plant. The winder is a web cutting apparatus which converts a big jumbo paper machine reel to smaller rolls. It winds the reels or webs, slitting them to narrower widths and trimming off the rough deckle edges. In this case, the subsequent trimming equipment such as the rewinder, sheeter, trimmer and cutter are collectively referred to as secondary processing equipment. A rewinder rewinds reels or webs and is similar to a winder but it can cut smaller sizes than the winder. There are different types of rewinders and winders available depending, in part, on the size of rolls being cut, including, for example, Biwinder, Bobin Winder, single and multi-pass units. A sheeter cuts a paper web into sheets with precision; a cutter also cuts paper webs into sheets but less precision. Sheeter and cutters are typically used to cut large rolls. A trimmer cuts large sheets to smaller ones.

Figure 2A:
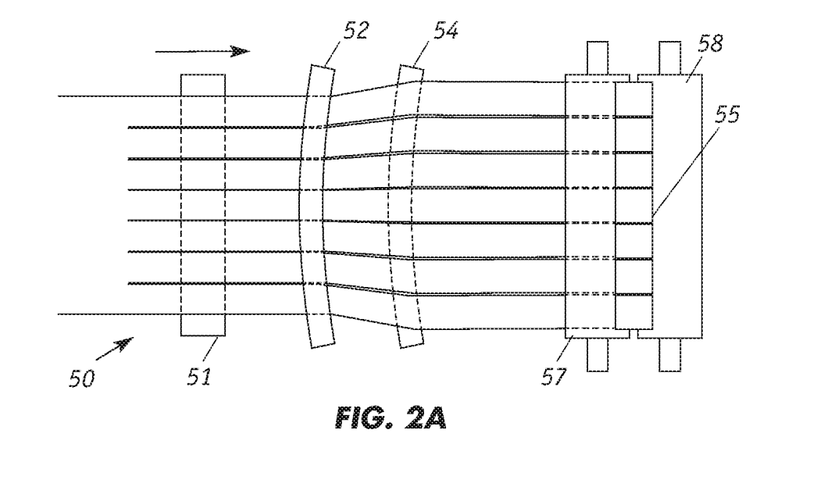
FIGS. 2A and 2B are plan and perspective views, respectively, depicting operations of a winder.
Figure 2B:
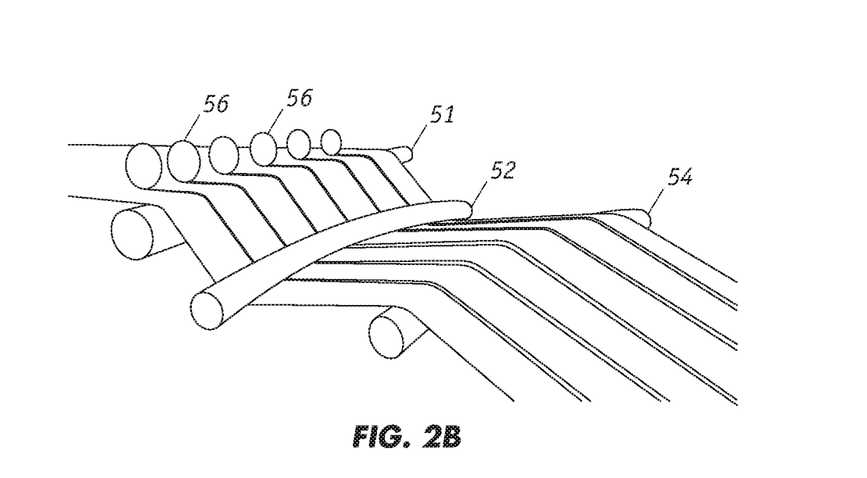

Winding is a roll-to-roll operation, which is illustrated in FIGS. 2A and 2B, where winder 50 cuts and winds the full-width, large-diameter paper reel 14 (FIG. 1) into suitable-size rolls 55. During winding, the full-width machine reel is transferred from the reel stand of the papermaking machine to an unwind stand. From the unwind stand, the paper is threaded through web-tensioning roll, adjustable knives or slitters 56, adjustable spreader bars 52, 54 (or rolls) and onto fiber or plastic cores. A rewind unit, which has two rolls 57 and 58, drives the winder. The spreader bars spread the web following slitting to prevent interweaving of web edges. In this illustration, the web is cut lengthwise to form seven smaller bands which are wound up onto individual product rolls. The positions of the knives 56 can be adjusted in accordance with cutting patterns for the machines to cut bands of different widths. The two outer rough edges of the reel are also trimmed off. Slitter-winder devices are described in U.S. Pat. No. 9,260,266 to Fohr, U.S. Pat. No. 9,187,285 to Daul, and U.S. Pat. No. 7,100,657 to Katoaka, which are incorporated herein by reference.

Figure 3:
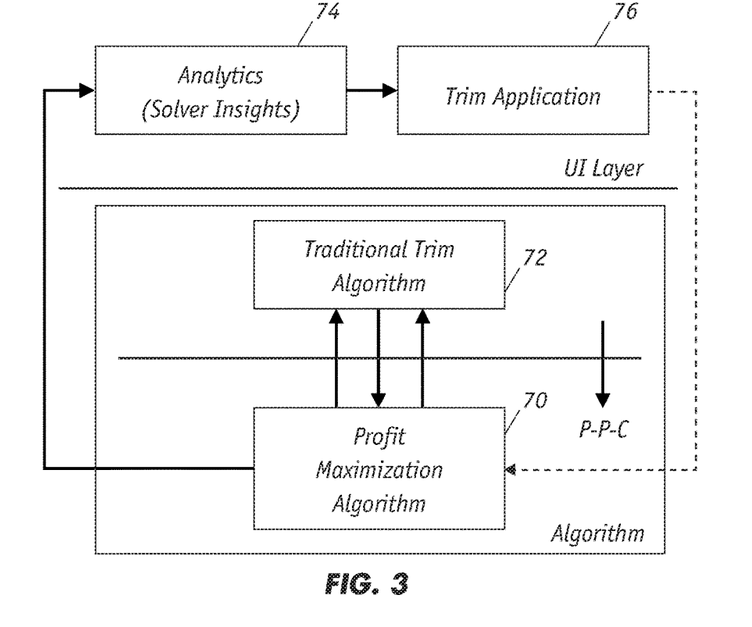
FIG. 3 depicts the general strategy of the planner insight for flat sheet industries.

FIG. 3 is an overview of the planner insight for flat sheet industries of the present invention. Traditional trim algorithms 72 focus on minimization of the number of master rolls used to fulfill customer demands or orders with relaxation on the upper bound of the demand constraints rather than minimization of trim loss. Applying established policies, parameters and constraints (P-P-C), the profit maximization algorithm 70 generates solutions to operate the trim applications 76 of primary and secondary equipment.

With the present invention, analytics 74 provides multiple suggestions to customers including new insights about the business and give suggestions regarding the order quantity and sizes they can make to achieve higher efficiencies. Planner insight helps identify the sizes and quantity which are costlier for the trimming in a particular batch. It identifies the cost impacted size which is used in creating a pricing strategy for the particular product and size. In particular, the insights are the sizes and percent increases or decreases in quantity for a particular size which could eventually improve the charting efficiency. Implementing the insights will realize up to 25% improvement in trim efficiencies for each recommendation, which is the insight of the batch.

The new insights will enable customers to build pricing strategies based on quantity and size. In particular, the new insights will identify certain sizes which cause more trim loss because there is no proper combination. Explore the order which could improve the efficiencies either from current set of orders, stock and future orders. It will reduce the person dependencies for planning. Planner insight will improve productivity as it will reduce the manual cost associated with executing the multiple iterations for reaching the desired trim loss. The planner insight will generate the solutions in a very short span as compared to conventional trim algorithms.

The planner insight employs a column generation approach based on a Knapsack algorithm which has an objective that includes the duality of both upper and lower bound demand constraints with information relating to loss and optimal usage. The objective functions are defined as minimization of loss instead of minimization of total number of rolls used for the batch.

Figure 4:
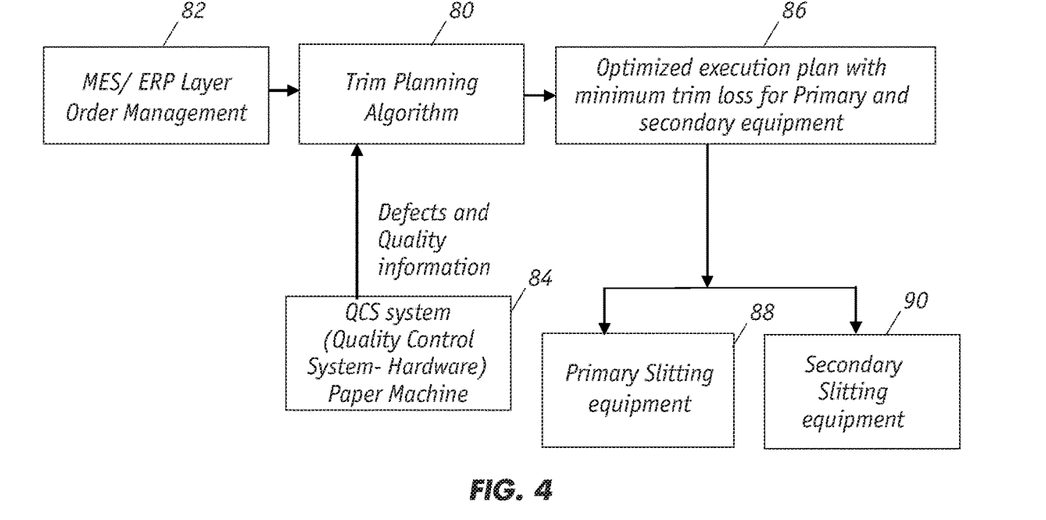
FIG. 4 is a flowchart of the overall trim planning process with integrated quality control system and primary and secondary equipment.

Referring to the trim planning process shown flow chart in FIG. 4, in step 82, orders are fed to the Trim Planning Algorithm 80. There are two different type of orders, namely customer order and stock order. All orders have dimension (width, diameter, length), ship to promise date, quantity, type of final product (grade) requested by consumer. All orders are typically managed by an order management system that runs in the Enterprise Resource Planning (ERP) or Manufacturing Execution System (MES) layer. The Trim Planning algorithm is also connected with quality control system (QCS) system of the papermaking machine 2 of FIG. 1 where it monitors, detects and controls the quality parameters and defects of the machine. Quality parameters and defects data are major input sources for quality-based trimming. The Trim Planning Algorithm generates in step 86 an optimized execution plan with minimum trim loss for the primary and secondary equipment. The execution plan is rolled out for the primary slitting equipment 88 and the secondary slitting equipment 90 through the IVIES interface between the equipment.

Figure 5:
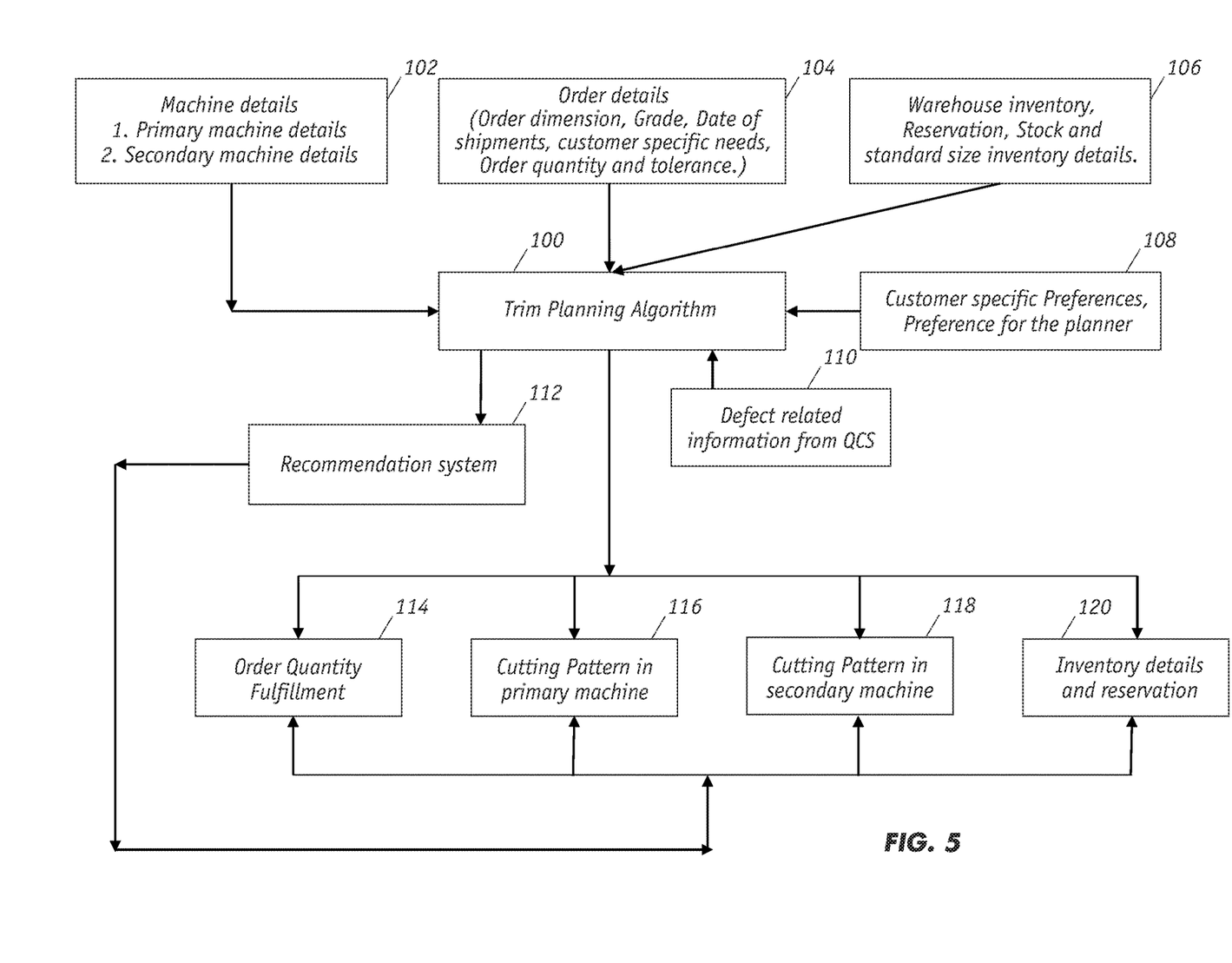
FIG. 5 is a flow diagram of the trim planning process with recommended system.

FIG. 5 is a detail flow chart showing operation of the Trim Planning Algorithm 100, which corresponds to step 80 of FIG. 4. Machine details 102 include machine master data for the primary or secondary equipment. For papermaking industries, the primary equipment includes the winder and the secondary equipment includes, for example, rewinders, sheeters, trimmers, extruders and coaters. The machine details include, for example, deckle of the equipment, number of rolls out, number of knives, production rates, capacities for specific grades of product, number of backstands, weight handling constraints and size handling constraints. The order details 104 include, for example, order dimensions, grades, product names, specific quality requirements, date of shipments, customer specific needs, order quantities and tolerances. Orders are managed by an order management system. Warehouse inventory 106 consists of information that is managed by a management system for various paper products that are stored at warehouses in different venues. The warehouse inventory data includes, for example, reservations of specific products and unassigned and available inventory of different products and sizes. Reservations relate to future customer specific orders which may be a confirmed order (99%). Some products are standard so orders can be fulfilled quickly. The warehouse manager can reserve some inventory to accommodate future orders that are forecasted.

In operation, to create a trim plan for a specific product (grade), a user selects specific machine parameters from machine details 102. User also selects the orders details 104 from the order management system. The machine details, order details and inventory details 106, from available inventory or unassigned inventory, are provided to the Trim Planning Algorithm 100. The algorithm can adjust and reserve the inventory if required. The customer specific preferences 108, such as, size specific and overall tolerance, premium zone, non-edge, quality parameters, stock roll preferences, secondary processing preferences, rolls per pack are provided as inputs to Trim Planning Algorithm. Finally, defects related information 110 from the QCS is provided as inputs for the Trim Planning Algorithm.

The Trim Planning algorithms 100 executes and generates solutions for four major components: (1) Order Quantity Fulfillment 114, (2) Cutting Pattern in Primary Machine 116, (3) Cutting Pattern in Secondary Machine 118, and (4) Inventory Details with Reservation 120. Typically, (i) the order quantity fulfillment comprises fulfilling must make orders within tolerance with respect to roll quantity, (ii) the primary cutting pattern for the primary machine comprises arrangements of slitters or knives for different roll sizes which includes original order roll size or parent roll size for secondary processing, (iii) the secondary cutting pattern for the secondary machine comprises different slitter or knives positions for original order roll sizes generated from parent rolls by the primary cutting pattern, and (iv) the inventory details comprise available roll sizes.

The Trim Planning Algorithm 100 also provides input for the recommendation system 112 which in turn generate recommendations and suggestions for improvements for each of the above-mentioned components 114, 116, 118 and 120. Based on the size combination and the given tolerance, the recommendation routine will provide set of sizes which will have additional tolerance to improve the efficiency. The recommendation is based on shadow prices and range concepts in optimization. Typically, the suggestions generated include, for example, identifying roll size with additional quantity beyond tolerance, (ii) identifying roll size with minimal reduction of quantity beyond tolerance, (iii) identifying roll size which can be removed from the current batch to improve the overall efficiency (iv) identifying different inventory sizes and roll quantities.

Figure 6:
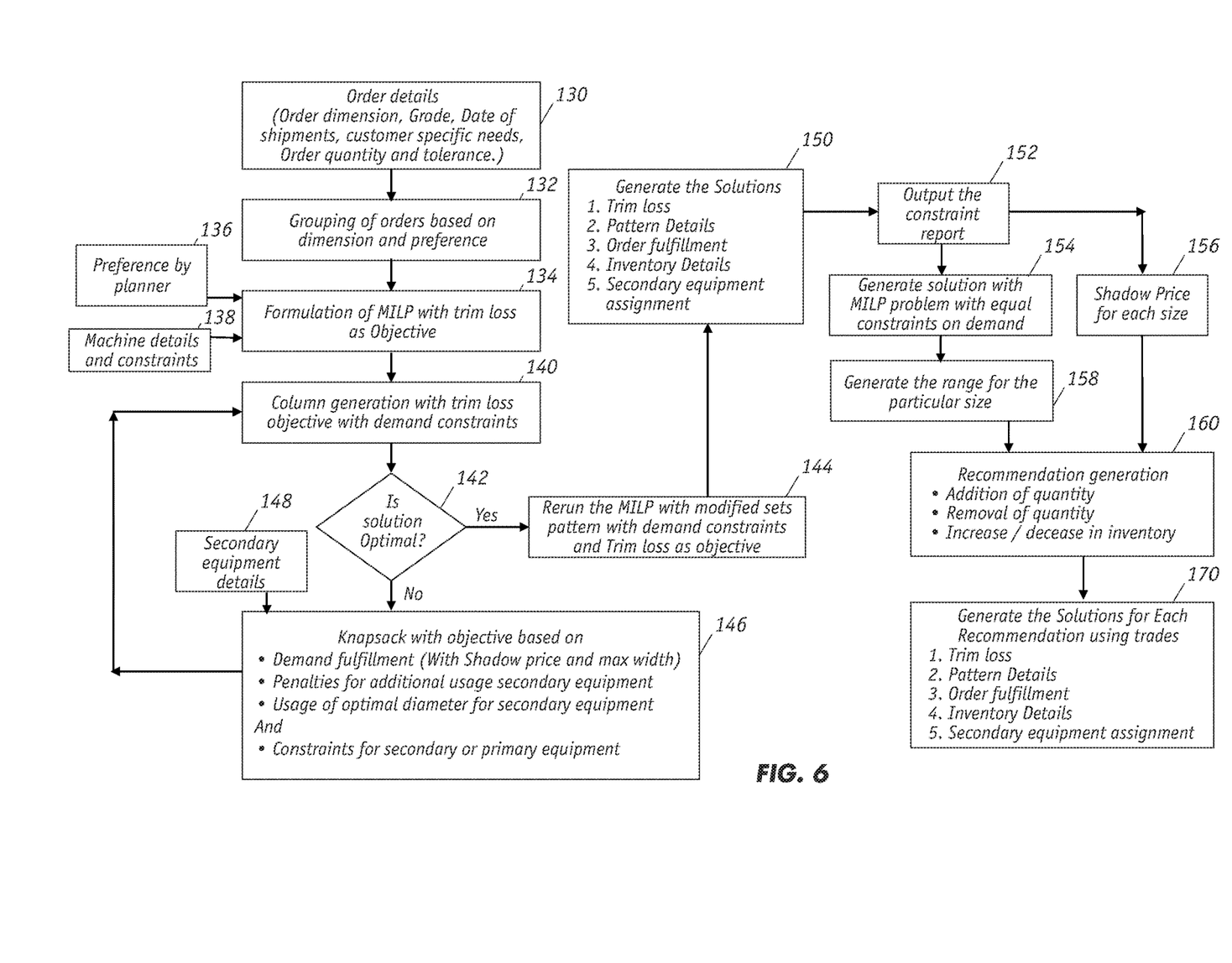
FIG. 6 is flow diagram of the algorithm.

FIG. 6 describes the execution of Trim Planner Algorithm 100 (FIG. 5) in further detail. Order details 130 are fed from an order manager system and the orders are grouped in step 132 based on their dimensions, grade or product type, and preferences. The grouping order is input for formulation of Mixed Integer Linear Programming (MILP) 134 with trim loss as the objective. Machine details 138 and customer specific preferences 136 are inputs for the MILP. A MILP trim problem is formulated with intern call column generation with trim loss objective with demand constraints. After execution the solution is generated in step 140. In the next steps, the solution is checked to determine whether it is optimal or suboptimal. If the solution is suboptimal, the solution is fed 146 to Knapsack combinatorial optimization problem with objective based on (i) demand fulfillment (with shadow price and maximum width), (ii) Penalties for additional usage secondary equipment, (iii) Usage of optimal diameter for secondary equipment, and (iv) constraints for secondary or primary equipment. In addition, the second equipment details are fed 148 to the Knapsack. The modified objective in step 146 is provided as input in step 138 through column generation. The loop runs until the solution becomes optimal.

When the solution is optimal, in step 144 the solution is rerun in the MILP with modified sets pattern with demand constraints and with trim loss as the objective. A solution 150 is generated. The solution contains (1) trim loss, (2) pattern details, (3) order fulfillment, (4) inventory details, and (5) secondary equipment assignment. A constraint report 152 is produced and the report generates two major outputs: one is the shadows price for each size 156 and the other is generating a solution with MILP problem with equal constraints on demand 154. Based on this solution, an estimate of the range 158 for the particular size with the additional quantity is generated. The shadow price 156 is fed to the recommendation system 160. The range of particular size is also fed to the recommendation system 160. The system generates the recommendations: (i) possible addition of quantity, (ii) possible removal of quantity, and (iii) Increase or decease in inventory. Finally, the information from the recommendation system 160 is used to generate the solutions for each recommendation using trade or business tolerances. The solution has five major components, namely: trim loss, pattern details, order fulfillment, inventory details, and secondary equipment assignment.

Solution Formulation

The standard or conventional formulation for the paper stock cutting problem starts with:
1. master reels (deckle, jumbo reels) of widths D.
2. with m orders of auxiliary reels of widths d1, d2, ..., dm.
3. each auxiliary reel having corresponding demands q1, q2, ..., qm.

A list of all meaningful feasible combinations of cuts associating with each pattern (a feasible combination of required widths) is constructed. The frequencies of each of the required width of the auxiliary reels in a pattern are evaluated and are designated as coefficients of the variables in the left-hand side of the inequality constraints. The demands q1, q2, ..., qm are delegated to the right-hand side of the inequality constraints and the sign ≥ (greater than or equal) is placed between the left and right-hand sides of the inequality constraints.

For the standard formulation, j is the maximum number of meaningful feasible combinations of master reel of width D. The objective of minimizing the number of master reel rolls to meet the demand of individual order.

For this formulation, $f_{i,a}$, is the number of times an order i appears in a feasible combination Xa of a master reel of standard width D.

The linear integer programming problem is then: Minimize Rolls:

$$\sum_{a=0}^{n} Xa$$

Subject to:

$$\sum_{a=1}^{j} f_{i,a} Xa \geq q_1 \; \forall \; I \text{ and } Xa \geq 0,$$

integer.

When a user solves the above problem, the user either uses a complete enumerated pattern generation approach or a column generation approach. The upper bound is not provided for in the demand in the column generation approach. The reason is that the column generation approach uses a Knapsack which uses the duality of above demand constraint in the pattern generation. The duality is used in both objectives. When a user wants to have both upper and lower bounds, the standard or conventional Knapsack approach does not work because it always tries to minimize the number of rolls used instead of the overall trim loss. Also, the current column generation approach uses a Knapsack based on lower bound on the demand. In actual practice, a user preferably wants to minimize the loss which is indirectly attained by the standard or conventional approach but it is not efficient because there is no upper limit of demand.

With the present invention, a user can minimize the loss with upper and lower bound limits on the demand. This is achieved by modifying the problem with respect to both the Knapsack objectives and approach. In particular, the proposed unique objective functions of the trim optimization algorithm contain a term related to loss which is eventually minimized. The objective of the Knapsack in the column generation approach contains the sum of the duality of upper and lower demand constraints subtracted by loss. By incorporating two additional terms for the dualities relating to the upper bound and loss, the term would eventually move to the solution to minimization of overall loss.

The new objective is: Minimize loss:

$$\sum_{a=0}^{n} Xa * (D - (\text{Pattern}_{a,a}) * (\text{width}_a)$$

subject to:

$$\sum_{a=1}^{j} f_{i,a} Xa \geq q_{li} \; \forall \; i \text{ Subject to: } \sum_{a=1}^{j} f_{i,a} Xa \leq q_{ui} \; \forall \; i \text{ and } Xa \geq 0,$$

integer
$q_{li}$=Lower quantity limit
$q_{ui}$=Upper Quantity limit.

Example

The techniques and benefits of the present invention are illustrated in the following example wherein a paper manufacturer receives customer orders and applies the planner insight. In this example, a winder is the primary equipment. The analytics provides novel insights about the business and generates a plurality of suggestions regarding the order quantities and sizes that can be made to efficiently fulfill the customer orders.

For this single batch trimming process, three major inputs are preferably used, including: (1) order details (roll sizes and quantities), (2) trade tolerance (at individual order/size level and entire batch/plan level) and (3) primary and secondary machine constraints (such as, deckle, minimum deckle and number of rolls out). In particular, the trade constraints typically comprise allowed over or under make quantity for each roll size or for entire order and overall allowed over or under run roll quantity for the batch. The primary machine specifications typically comprise deckle size, number of slitters, roll weight handling, minimum roll size, maximum roll size, number of roll outs and additional loss needs to consider, and type of winder. The secondary machine specifications typically comprise of number of backstands which load the rolls, number of stack outs, deckle sizes, number of slitters, roll weight handling, minimum roll size, maximum roll size, number of roll outs and additional losses needs to be considered, and type of rewinder.

The orders and sizes as listed in the following table. The optional order is a stock order with future delivery date. An optional order need not be produced or if produced can be partially or completely fulfilled thus the quantity can be designated as zero or ordered. All the other orders are must make orders.

| Order Size (cm) | Order quantity (Number of rolls) |
| --- | --- |
| 103 | 6 |
| 123 | 7 |
| 133 | 1 |
| 160 | 1 |
|  | (Optional order) |
| 165 | 4 |
| 175 | 10 |
| 193 | 10 |
| 195 | 12 |
| 210 | 3 |
| 213 | 8 |
| 216 | 18 |
| 220 | 5 |
| 235 | 8 |
| 250 | 26 |
| 265 | 6 |
| 280 | 14 |

The trade constraints for each roll size are:

| Parameter | Unit of Measurement | Value |
| --- | --- | --- |
| Overrun for each size | Number of rolls | 2 |
| Underrun for each size | Number of rolls | 1 |
| Overrun for entire batch | Number of rolls | 15 |
| Underrun for entire batch | Number of rolls | 15 |

Primary and Secondary Machine constraints are:

| Parameter | Unit of Measurement | Value |
| --- | --- | --- |
| Deckle | Centimeter | 768 |
| Number of out | Number | 10 |
| Target min. sets | Number | 1 |
| Minimum Deckle | Inch (cm) | 400 (157 cm) |

The Number of Out is the number of rolls that are cut in one pattern by the winder and is based on number of knives in the winder. (For example, the maximum Number of Out is equal to number of total knives minus 1). The first knife is at the edge of the winder. Target minimum sets is the minimum number of sets of a particular cutting pattern when a solution is generated. Minimum deckle is the designated by the customer to achieve effective utilization of the deckle. The customer specifies the minimum pattern size width to be above the minimum deckle. For example, a deckle standard size 500 cm, the user may want 470 cm as the minimum deckle, consequently, all patterns generated from the solution will have a deckle 470 cm or higher.

With the above constraints, the algorithm as illustrated in FIGS. 4-6 generates a cutting pattern based on column generation approach using Knapsack. In particular, the algorithm initially executes sizes with consideration of trade constraints (individual and overall size) for each size and batch level and yields the following solution:

| Parameter | Unit of Measurement (UOM) | Value |
|---|---|---|
| Trim Loss | % | 0.43% |
| Pattern | Number | 13 |
| Number of sets | Number | 39 |
| Under run | % | 0 |
| Over run | % | 0 |

The pattern number is an index that identifies the individual pattern. A batch is then executed with the analytics and generates five suggestions (depending on configuration). The solution comparison for each recommendation is generated solution. The solutions for the corresponding recommendations are shown below.

| Parameter | UOM | Solution 1 Size | Solution 1 Qty | Solution 2 Size | Solution 2 Qty | Solution 3 Size | Solution 3 Qty | Solution 4 Size | Solution 4 Qty | Solution 5 Size | Solution 5 Qty |
|---|---|---|---|---|---|---|---|---|---|---|---|
| Recom- | | 103 | 1 | 103 | 1 | 103 | 1 | 103 | 5 | 103 | 1 |
| mendation | | 133 | 1 | 213 | 2 | 216 | 2 | 250 | 1 | 195 | 1 |
| | | 160 | 1 | 216 | 1 | 220 | 1 | | | 235 | 2 |
| | | 165 | 1 | | | | | | | | |
| Trim Loss | % | 0.18 | | 0.21 | | 0.21 | | 0.21 | | 0.20 | |
| Pattern | Number | 12 | | 11 | | 11 | | 11 | | 12 | |
| Number of sets | Number | 41 | | 41 | | 41 | | 39 | | 40 | |
| Underrun | % | 2.82 | | 3.52 | | 3.52 | | 6.52 | | 4.23 | |
| Overrun | % | 9.15 | | 9.51 | | 9.15 | | 6.94 | | 7.04 | |

(Qty is quantity)

For this example, five solutions are generated, each with recommendations which are the minimum overriding of the tolerance. In solution 1, the suggestion in fulfilling the entire order as set forth in the above first table is to make 1 additional roll for each of sizes 103, 133, 160 and 165 cm. If solution 1 is implemented, the trim loss is 0.18% which is the overall trim loss percentage. (For example, a trim loss of 1% corresponds to an efficiency of the cut pattern that is 99%.) This solution has 12 possible combinations of cutting patterns that fit into the overall width (deckle size). The number of sets (42) is the total number of reels (deckle size) used to fulfill all the orders of different sizes. The underrun of 2.82% is the percentage of quantity made (less) below the order for the entire batch and the overrun of 9.15% is the percentage of quantity made (more) above the order for the entire batch. Trim loss, underrun and overrun are parameters that gauge the effective of the solution. A person selects one of the solutions to operate the primary and secondary equipment to fulfill the order.

The foregoing has described the principles, preferred embodiments and modes of operation of the present invention. However, the invention should not be construed as being limited to the particular embodiments discussed. Thus, the above-described embodiments should be considered as illustrative rather than restrictive, and it should be appreciated that variations may be made in those embodiments by workers skilled in the art without departing from the scope of the present invention as defined by the following claims.

What is claimed is:

1. A method of generating optimal trimming patterns for trimming raw rolls and/or sheets for fulfillment of a flat sheet stock and/or customer orders that comprises:
    (a) receiving customer order specifications;
    (b) receiving primary machine specifications;
    (c) receiving secondary machine specifications;
    (d) receiving warehouse inventory specifications;
    (e) receiving trade constraints;
    (f) generating solutions for the following parameters (i) order quantity fulfillment, (ii) a primary cutting pattern for the primary machine, (iii) a secondary cutting pattern for the secondary machine, and (iv) inventory details, wherein the solutions are generated with consideration of the received trade constraints;
    (g) executing a batch and generating suggestions;
    (h) generating modified solutions for the parameters in step (f) using revised trade constraints derived from the suggestions generated in (g) wherein steps (f), (g) and (h) are executed with a Knapsack algorithm that employs a column generation approach and wherein the Knapsack algorithm has an objective function for minimizing of trim loss and has an objective which includes a duality of both upper and lower bound demand constraints with information related to trim loss and optimal usage; and
    (i) operating a cutting apparatus by:
    receiving a reel or sheet of material to be cut;
    configuring the cutting apparatus with the modified solutions generated in step (h); and
    operating the configured cutting apparatus to cut the reel or sheet of material into a plurality of smaller reels or sheets.

2. The method of claim 1 wherein (i) the order quantity fulfillment comprises fulfilling must make orders within tolerance with respect to roll quantity, (ii) the primary cutting pattern for the primary machine comprises arrangements of slitters or knives for different roll sizes which includes original order roll size or parent roll size for secondary processing, (iii) the secondary cutting pattern for the secondary machine comprises different slitter or knives positions for original order roll sizes generated from parent rolls by the primary cutting pattern, and (iv) the inventory details comprise available roll sizes.

3. The method of claim 1 wherein the trade constraints comprise allowed over or under make quantity for each roll size or for entire order and overall allowed over or under run roll quantity for the batch.

4. The method of claim 1 wherein the customer order specifications are selected from the group consisting of roll dimensions, grades, dates of shipments, customer specific needs, roll quantities and tolerances.

5. The method of claim 1 wherein the primary machine specifications are selected from the group consisting of deckle size, number of slitters, roll weight handling, minimum roll size, maximum roll size, number of roll outs and additional loss needs to consider, type of winder, and mixtures thereof.

6. The method of claim 1 wherein the secondary machine specifications is selected from the group consisting of number of backstands which load the rolls, number of stack outs, deckle sizes, number of slitters, roll weight handling, minimum roll size, maximum roll size, number of roll outs and additional losses needs to be considered, type of rewinder, and mixtures thereof.

7. The method of claim 1 wherein the warehouse inventory specifications comprise diameter/length of rolls and maximum roll quantity.

8. The method of claim 1 wherein the suggestions generated in step (g) are selected from the group consisting of (i) identifying roll size with additional quantity beyond tolerance, (ii) identifying roll size with minimal reduction of quantity beyond tolerance, (iii) identifying roll size which can be removed from the current batch to improve the overall efficiency (iv) identifying different inventory sizes and roll quantities, and mixtures thereof.

9. The method of claim 1 wherein the modified solutions generated in step (h) comprise options to a user to override initially received trade constraints or inventory specifications.

10. The method of claim 1 further comprising receiving defects related information for the raw rolls and/or sheets in the warehouse inventory.

11. The method of claim 1 wherein the flat sheet stock comprises paper, rubber, plastic or metal.

12. The method of claim 1 wherein the objective function is defined as minimization trim loss and not of minimization of total number of rolls used for the batch.

13. A trimming system which comprises:
a computer device that:
(a) receives customer order specifications;
(b) receives primary machine specifications;
(c) receives secondary machine specifications;
(d) receives warehouse inventory specifications;
(e) receives trade constraints;
(f) generates solutions for the following parameters (i) order quantity fulfillment, (ii) a primary cutting pattern for the primary machine, (iii) a secondary cutting pattern for the secondary machine, and (iv) inventory details, wherein the solutions are generated with consideration of the received trade constraints;
(g) executes a batch and generates suggestions;
(h) generates modified solutions for the parameters in step (f) using revised trade constraints derived from the suggestions generated in (g) wherein the computer device is configured to executed steps (f), (g) and (h) with a Knapsack algorithm that employs a column generation approach and wherein the Knapsack algorithm has an objective function for minimizing of trim loss and has an objective which includes a duality of both upper and lower bound demand constraints with information related to trim loss and optimal usage; and
a cutting apparatus for cutting a reel or sheet of material into a plurality of smaller reels or sheets of material, wherein the cutting apparatus is configured to receive the modified solutions generated in step (h).

14. The trimming system of claim 13 wherein the cutting apparatus is selected from the group consisting of winder, rewinder, sheeter, trimmer, cutter and mixtures thereof.

15. The trimming system of claim 14 wherein the cutting apparatus comprises a plurality of adjustable slitters or knives that cut a wide sheet into a plurality of sheets of predetermined widths.

16. The trimming system of claim 14 wherein the material comprises paper, rubber, plastic or metal.

17. The trimming system of claim 13 wherein the objective function is defined as minimization trim loss and not of minimization of total number of rolls used for the batch.

* * * * *